United States Patent
Ratigan et al.

(10) Patent No.: US 12,186,631 B1
(45) Date of Patent: *Jan. 7, 2025

(54) ROPE EDGE PROTECTION SYSTEM

(71) Applicants: Michael Ratigan, Elon, NC (US);
Edward Ratigan, Graham, NC (US)

(72) Inventors: Michael Ratigan, Elon, NC (US);
Edward Ratigan, Graham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,452

(22) Filed: Nov. 29, 2023

Related U.S. Application Data (63) Continuation of application No. 18/055,443, filed on Nov. 15, 2022, which is a continuation-in-part of application No. 17/644,951, filed on Dec. 17, 2021, now Pat. No. 11,596,838, which is a continuation of application No. 17/076,334, filed on Oct. 21, 2020, now Pat. No. 11,219,800.

(51) Int. Cl.
*F16L 57/06* (2006.01)
*A63B 29/02* (2006.01)

(52) U.S. Cl.
CPC .............. *A63B 29/02* (2013.01); *F16L 57/06* (2013.01)

(58) Field of Classification Search
CPC ........ F16L 57/06; B63B 21/04; B63B 29/028; B63B 29/02; B63B 29/08; B63B 2209/10; B66C 1/122
USPC .... 138/118.1, 110, 151, 156, 128; 428/35.1, 428/36.9, 36.1; 254/389; 248/205.2, 248/68.1
See application file for complete search history.

(56) References Cited

U.S. PATENT DOCUMENTS

| | | | |
|---|---|---|---|
| 4,402,489 | A | 9/1983 | Murray |
| 5,535,787 | A | 7/1996 | Howell |
| 5,901,756 | A | 5/1999 | Goodrich |
| 7,325,575 | B1 | 2/2008 | O'Donnell et al. |
| 8,752,590 | B2 | 6/2014 | Petty et al. |
| 10,213,649 | B2 | 2/2019 | Norton |
| 2002/0170727 | A1 | 11/2002 | Holland et al. |
| 2011/0272654 | A1 | 11/2011 | Fay et al. |

(Continued)

OTHER PUBLICATIONS

Webpage printout showing Ultra-Pro TM Edge Protectors as sold by CMC Pro, print date Jul. 30, 2020.

(Continued)

*Primary Examiner* — Patrick F Brinson
(74) *Attorney, Agent, or Firm* — Tuggle Duggins P.A.; Blake P. Hurt; Reinier R. Smit (57) ABSTRACT

A rope edge protection system having a rope protection mat, an edge protection mat, and/or a replaceable abrasion pad in combination for the protection of rope. The rope protection mat is a generally rectangular sheet that may be secured in a sleeve-like configuration around a climbing rope and move along the rope with the user. The rope protection mat and/or replaceable abrasion pad are configured to be replaceable after it is sufficiently worn down from use. The replaceable abrasion pad is configured to be laid flush overtop the edge protection mat. The edge protection mat is a generally rectangular sheet that has one or more frictional sections positioned on a bottom side that add resistance to horizontal force vectors to the edge protection mat during use. The edge protection mat is a multi-layer sheet with a high loft layer to decrease the bend radius of the rope across a ledge.

19 Claims, 10 Drawing Sheets

(56) References Cited

U.S. PATENT DOCUMENTS

2012/0037527 A1    2/2012  Fay et al.
2015/0267347 A1    9/2015  Farmer
2016/0279477 A1*   9/2016  Petty ................... A63B 29/028
2016/0325969 A1   11/2016  Randle

OTHER PUBLICATIONS

Webpage printout from Amazon showing P68 Set Caterpillar Articulated Protector sold by Petzl America, print date Jul. 30, 2020.
Webpage printout from safewaze.com showing SafeWaze Rope Protector, print date Jul. 30, 2020.
Webpage printout from ropesafeusa.com showing Ropesafe Edge Protection System, copyright RopeSafe Edge Protection System 2020.
Webpage printout from rescuetech1.com showing RescueTECH Rope Guard, copyright 2003, 2004, 2005, 2006, 2007, 2008, 2009, 2010 Rescue Technology / Technical Rope Rescue Equipment.

* cited by examiner

ROPE EDGE PROTECTION SYSTEM

This application is a continuation of, and claims benefits under pending prior application Ser. No. 18/055,443 filed 15 Nov. 2022 which is a continuation-in-part (CIP) of Ser. No. 17/644,951 filed 17 Dec. 2021, which issued as U.S. Pat. No. 11,596,838 on 7 Mar. 2023, which is a continuation (CON) of Ser. No. 17/076,334 filed 21 Oct. 2020, which issued as U.S. Pat. No. 11,219,800 on 11 Jan. 2022, all of which are incorporated by reference in their respective entireties herein.

FIELD OF THE INVENTION

The disclosure relates to a device for the protection of ropes and specifically to a device for protecting climbing ropes from abrasion.

DESCRIPTION OF THE PRIOR ART AND OBJECTIVES OF THE INVENTION

Professionals, such as firefighters, rescue workers, police, roofers, window washers and others, rely on ropes to safely perform their duties. Military personnel and civilians also use ropes for scaling cliffs and ledges, or to ascend or descend from cliffs, ledges, rooftops, interior of caves, boilers, and ship hulls, etc. In these and other uses, the ropes are required to pass over rocks, railings, window ledges, edges of buildings and other locations where the fibers of the rope can become abraded, which compromises the load-bearing capabilities of the rope and the safety of the user.

To protect the ropes from such abrasion, it is known in the art to place something between the rope and the adjacent structure. The Ultra-Pro™ Edge Protector sold by CMC Pro is semi-rigid molded plastic sheet that has a plurality of channels formed along the longitudinal axis of the sheet. The channels allow the ropes to be maintained in spaced-apart relation when the device is in use. The sheet is flexible at least along the longitudinal axis and can conform to the edge of a building. The device is said to reduce friction on the ropes and to soften the bend radius of the rope. Similar devices are sold by Seattle Manufacturing Corporation under the brand names "FLEX" and "Rope Tracker." Another type of device, known as an articulated edge protector, comprises a series of roller modules. Each module has a roller supported by a frame that acts as a standoff to elevate the roller from an adjacent surface. The roller modules may be linked together to form a flexible articulated chain which is then placed over an edge of a structure. The rope is then placed atop the roller(s). An example of such a device is the P68 Set Caterpillar Articulated Protector sold by Petzl America. Yet another type of rope protection device is a flexible mat made from abrasion-resistant materials that can be placed between the rope and an adjacent structure. The mat can be used flat or wrapped around the rope and secured to form a protective sleeve. Numerous such devices are commercially available, such as the SafeWaze Rope Protector, RopeSafe and RescueTECH Rope Guard. One such mat, as taught in U.S. Pat. No. 10,213,649 (the entire disclosure of which is incorporated herein by reference) can also be attached to the rope and be repositioned along the rope by the user. The mat includes a handle used to carry the mat and facilitate repositioning the mat during use and can also be used as a load bearing member.

Regardless of these, and other, attempts to protect the professional and personal ropes of the world, the current solutions are ineffective. Thus, in view of the problems and disadvantages associated with prior art devices, the present disclosure was conceived and one of its objectives is to provide a rope protection system that has increased versatility, is light in weight, and yet offers heavy durability during use.

It is another objective of the present disclosure to provide a rope protection system that has functionality to protect ropes from abrasion.

It is still another objective of the present disclosure to provide a rope protection system that can soften the radius of bend of a rope.

It is yet another objective of the present disclosure to provide a rope protection system that is useful as a load bearing support.

It is a further objective of the present disclosure to provide a rope protection system that incorporates visual safety indicators.

It is yet a further objective of the present disclosure to provide a rope protection system with light weight replaceable abrasion pads to extend the useful life of the rope protection system.

It is still a further objective of the present disclosure to provide a rope protection sleeve that, when in a sleeve-like configuration, prevents the rope protection sleeve from sliding down a substantially vertical rope.

Various other objectives and advantages of the present disclosure will become apparent to those skilled in the art as a more detailed description is set forth below.

SUMMARY OF THE INVENTION

In an embodiment, the present disclosure provides a rope edge protection system to minimize chafe or abrasion on ropes. The rope edge protection system comprises two flexible mats or sheets, used in combination. The first sheet is a rope protection sheet having an inner surface and an outer surface, two opposed lateral edges and two opposed longitudinal edges. A hanging loop is affixed to each lateral edge and a pair of spaced-apart loops are affixed to the inner surface. The rope protection sheet can be wrapped in a sleeve-like configuration about a rope and secured in place with a pair of spaced-apart straps, each located proximate a respective lateral edge of the mat and/or a mating fastener member on longitudinal edges of the sleeve. The second sheet is an edge protection mat having an inner surface and an outer surface with multiple intermediate layers, two opposed lateral edges and two opposed longitudinal edges. A loop is affixed to each corner of the edge protection mat and a pair of spaced-apart loops are affixed to at least one of the inner surface or outer surface. The second sheet has a high loft layer to soften the bend radius of the rope. Both the edge protection sheet and the rope protection sheet incorporate visual safety indicators.

In an alternate embodiment, the present disclosure provides a rope edge protection system to minimize chafe or abrasion on ropes. The rope edge protection system comprises an edge protection mat that defines a top side and a bottom side. The top side further includes a fastener that further comprises a first fastener component and a second fastener component. The rope edge protection system further comprises a replaceable abrasion pad having a fastener that includes a first fastener section and a second fastener section. The first and second replaceable abrasion pad fastener sections are configured to be removably attachable to different first and second fastener components of the edge protection mat. When the first and second abrasion pad fastener sections and first and second edge protection mat fastener components are mated, the replaceable abrasion pad and edge protection mat are configured so that an inner surface of the replaceable abrasion pad is flush with the top surface of the edge protection mat. Both the replaceable abrasion pad and the edge protection mat each define two longitudinal sides and two lateral sides. The first and second fastener sections are positioned on different longitudinal sides of the of the replaceable abrasion pad. The longitudinal sides and lateral sides of the replaceable abrasion pad collectively define a mat perimeter. The replaceable abrasion pad includes a trim that follows the defined perimeter. The first and second fastener components are positioned on different longitudinal sides of the edge protection mat. The replaceable abrasion pad includes one or more hanging loops extending from at least one lateral side. The edge protection mat ideally includes two or more daisy chains positioned along the longitudinal sides for easily attaching other climbing accessories. The bottom side of the edge protection mat includes one or more frictional sections. The longitudinal sides and lateral sides of the edge protection mat collectively define a perimeter. The edge protection mat includes a trim that follows the defined perimeter.

DETAILED DESCRIPTION OF THE PREFERRED EMBODIMENT AND OPERATION OF THE INVENTION

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily includes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

The rope edge protection system of the disclosure is a device ideally suited for protecting a climbing rope that, in part, is configured to surround a climbing rope. In a preferred embodiment, the rope edge protection system has two flexible portions or mats that are used in combination to provide superior protection to ropes and other equipment used by climbers, window washers, firefighters, rescue crews, etc.

Figure 1:
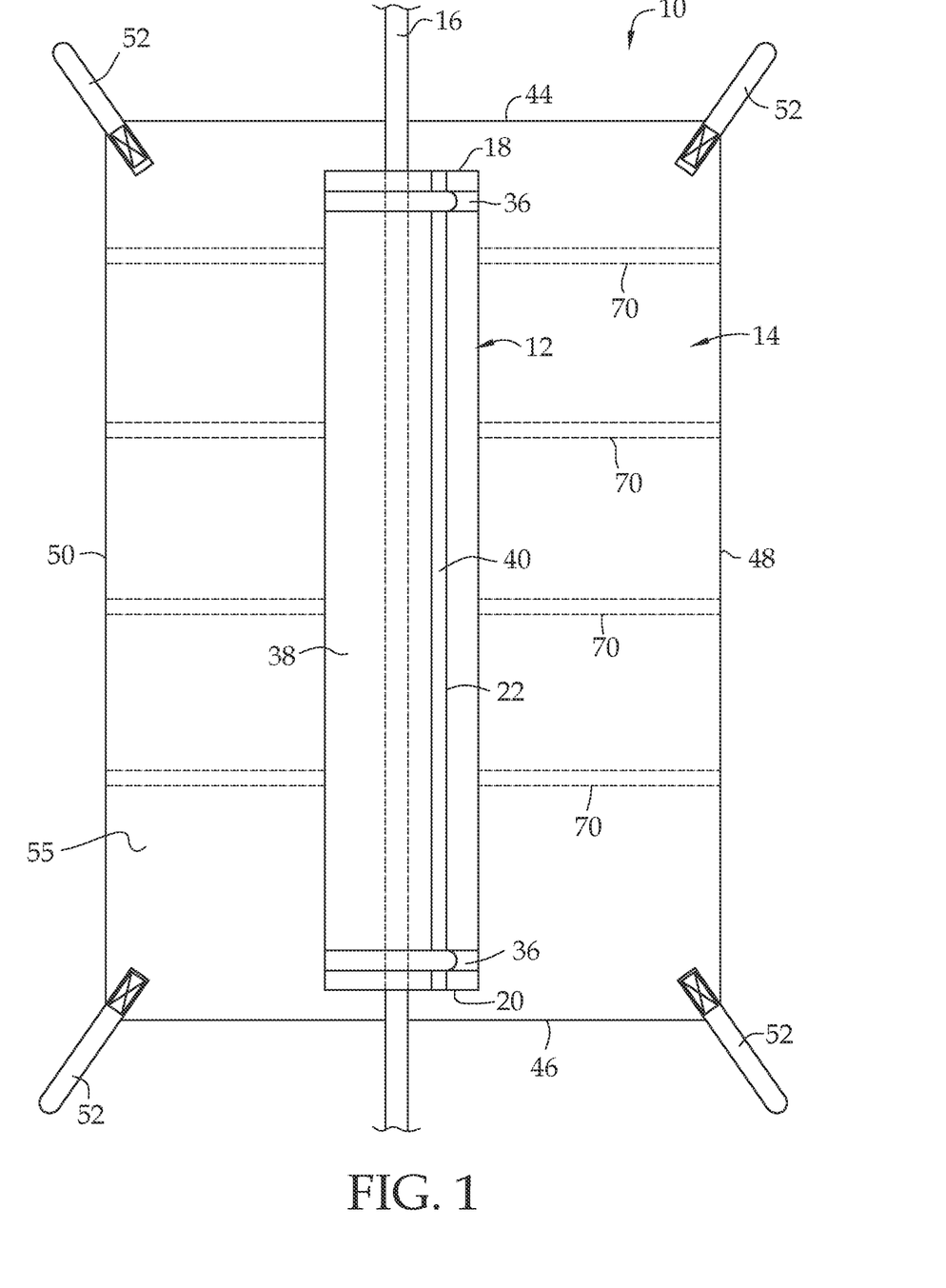
FIG. 1 is a plan view of a preferred embodiment of the rope edge protection system, illustrating the rope protection mat closed around a rope and placed atop the edge protection mat.

With reference to FIG. 1, the preferred embodiment of the rope edge protection system 10 includes a rope protection mat 12 and an edge protection mat 14. While the rope protection system of the disclosure is quite versatile, in the most common contemplated use the rope protection mat 12 would be wrapped around the climbing rope 16 and then placed on top of the edge protection mat 14, which would be placed adjacent to the building or other structure (not shown). Once the user is in position, the rope protection mat 12 could be moved along the rope 16 as the user descends or ascends the rope, if desired.

Figure 2:
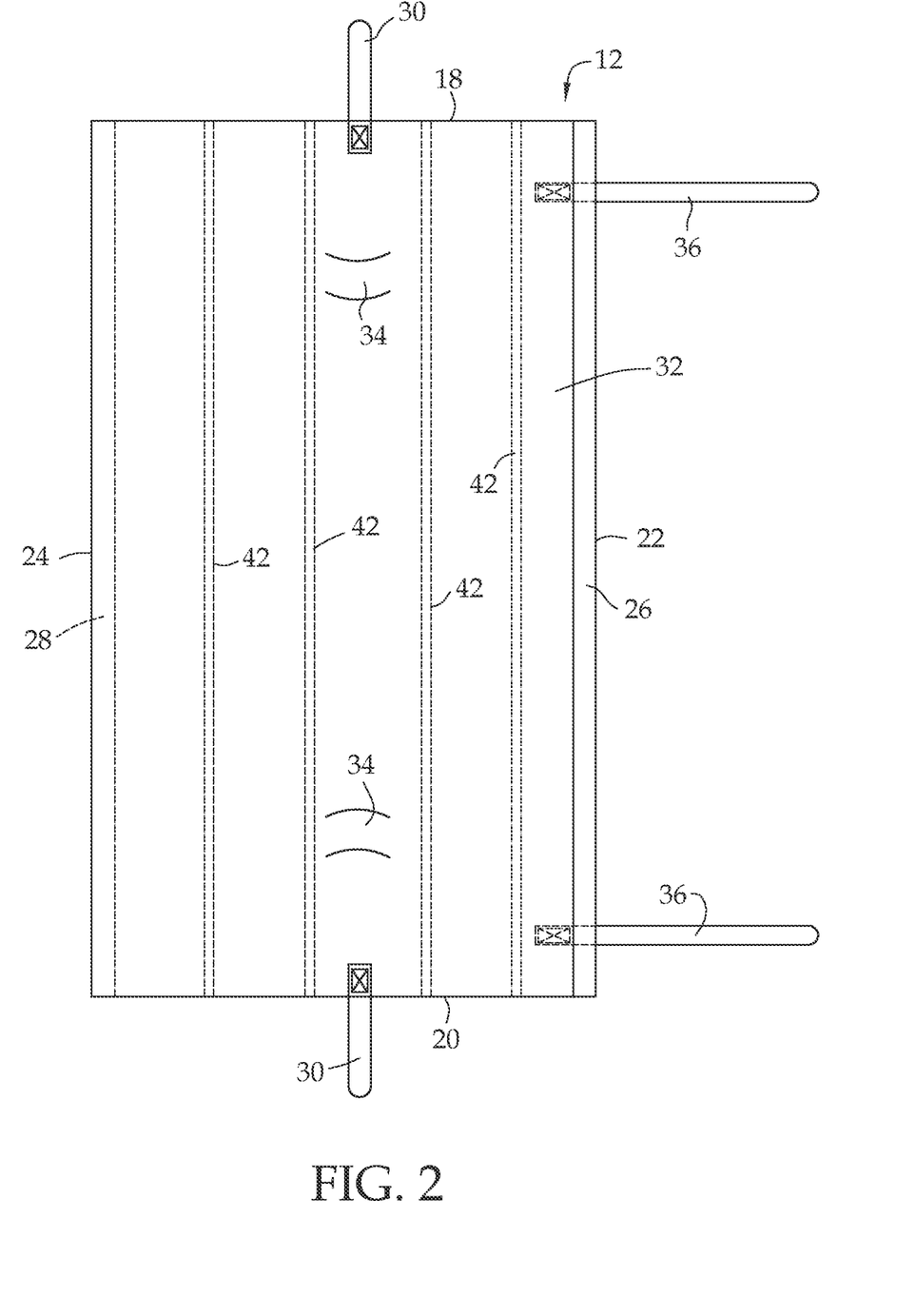
FIG. 2 is a plan view of the rope protection mat of the rope edge protection system, shown in open configuration and illustrating the inner surface of the mat.

As can be seen in FIG. 2, an embodiment of the rope protection mat 12 in its open position, illustrating the inner surface of the mat, preferably defines a generally rectangular configuration having opposed lateral edges 18, 20 and opposed longitudinal edges 22, 24. Longitudinal edges 22 and 24 comprise a fastener including a first fastener component 26 and a second fastener component 28 (shown in phantom) enabling at least a portion of the length of the longitudinal edges 22 and 24 to be removably attached to each other. The fastener components 26, 28 are preferably individual halves of a fastening tape that when used together allow closure for ease of use, although other closing mechanisms can be utilized as are known in the art for attaching and detaching at least a portion of the opposing longitudinal edges 22 and 24 of the flexible mat 12. Non-limiting examples of closure devices are buttons, snaps, zippers, hook and eye fasteners or magnetic fasteners. Rope protection mat or sleeve 12 should define a sufficient modulus of flexion to provide an opening large enough for a load-bearing rope to pass through the opening created when the fastener halves 26, 28 are engaged and the edges 22, 24 are attached to each other.

With continued reference to FIG. 2, a hanging loop 30, each approximately 1-2 inches (2.54-5.08 cm) in length, is affixed to each of the lateral edges 18, 20 of the rope protection mat 12. These hanging loops 30, 30 can be used to secure the rope protection mat 12 to the climbing rope 16 (FIG. 1) or to an anchor device. It is also seen in FIG. 2 that the inner surface 32 of rope protection mat 12 includes one or more, and preferably a pair of spaced-apart loops 34, 34. These loops 34, 34 allow the user to insert for example, a 1 inch (2.54 cm) anchor sling 35 (FIG. 3) under the loops, thus allowing the user to anchor the loop at the top side end and use the bottom end as a handle to assist the user getting into position before they descend down the building. The system can also be used as an anchor point and the climber hooking up the top loops on the sling. Edge protection mat 14 likewise includes one or more, and preferably a pair of spaced-apart loops 56, 56, for the insertion of anchor sling 35 as described herein.

A pair of spaced-apart closure straps 36, 36 are located proximate to and oriented parallel to the lateral edges 18, 20 of rope protection mat 12. When the rope protection mat 12 is in the closed position, as seen in FIG. 1, the closure straps 36, 36 wrap around the mat and maintain the mat 12 in a closed position as desirable. The closure straps 36, 36 may be used in addition to or in lieu of first and second fastener components 26, 28.

The outer face 38 (see FIG. 1) of the rope protection mat 12 is preferably made of a woven polymeric material, more preferably a woven nylon material, and most preferably a woven nylon material in a herringbone weave pattern, with the inner face 32 preferably formed from 1000 denier (D) ballistic nylon. The material used to make the outer face 38 is preferably a dark color, such as black, and the material used to make the inner face is preferably a high-visibility color such as yellow, orange or lime green. The term "high-visibility color" (or "hi-vis" for short) in this context is taken to include all high-visibility apparel embodiments as defined by ANSI/ISEA 107-2015, including Type O, Type R, and Type P embodiment types of Class 1, 2, 3, E, and Optional High-Visibility Accessory performance classes. The high color contrast between the layers 38, 32 is preferred as a visual safety indicator alerting the user that the outer layer has worn through, exposing the high-visibility layer.

A preferred embodiment of outer face 38 is provided with reflective material 40 along the peripheral edges (18, 20, 22, 24) as an additional visual safety indicator. As a further additional visual safety feature, the materials used for the inner face and outer face are preferably sewn together using reflective thread 42 (FIG. 2). An example of an acceptable reflective thread is the reflective thread offered commercially by Ki-Shin Corp., which is a 2000 denier, three filament thread with a tenacity of ~3800 cN. Tapes, appliques, and powered illumination sources may also be incorporated as desirable.

Figure 3:
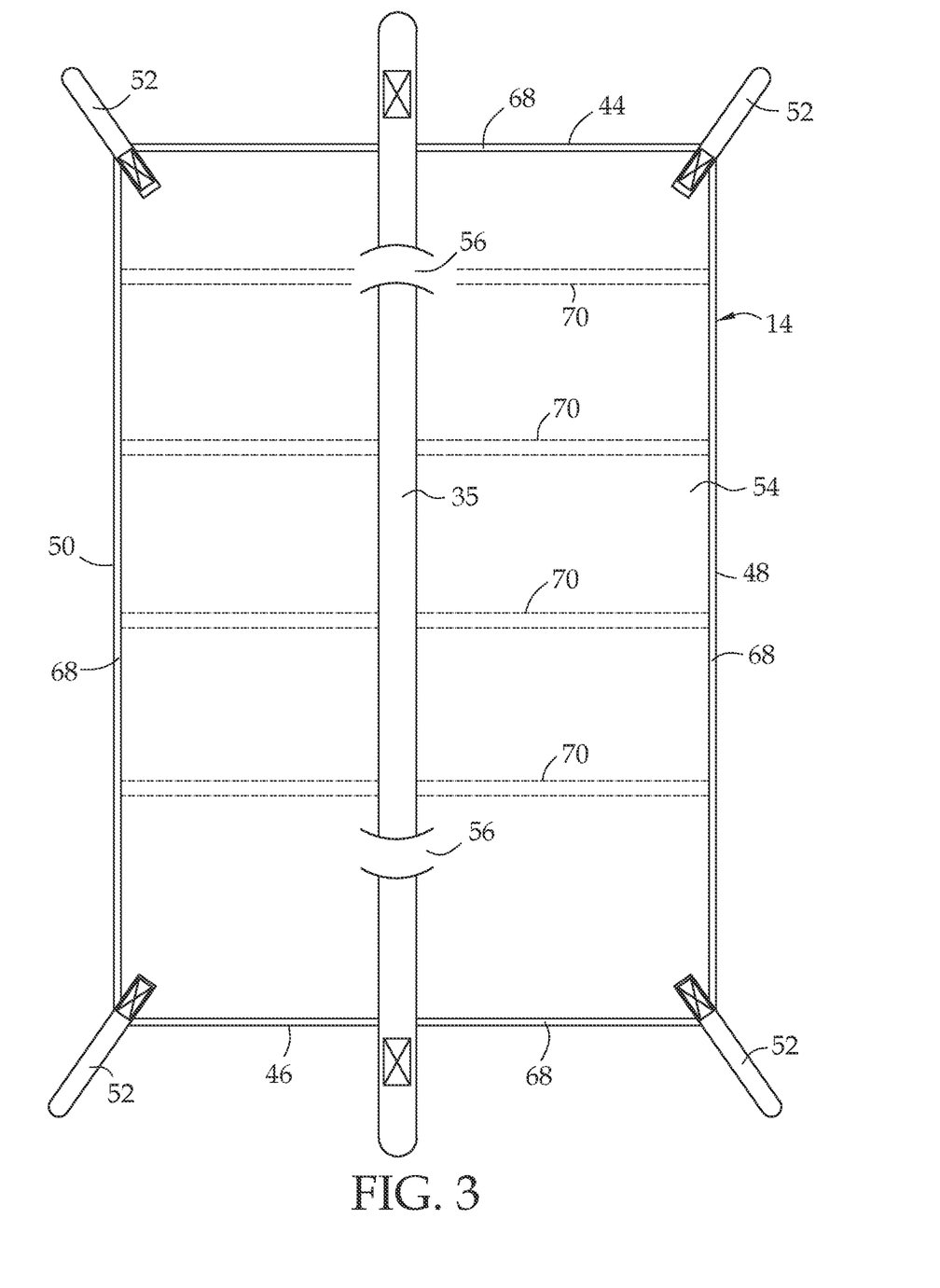
FIG. 3 is a plan view of the edge protection mat of the rope edge protection system and illustrating the outer surface of the mat.
Figure 4:
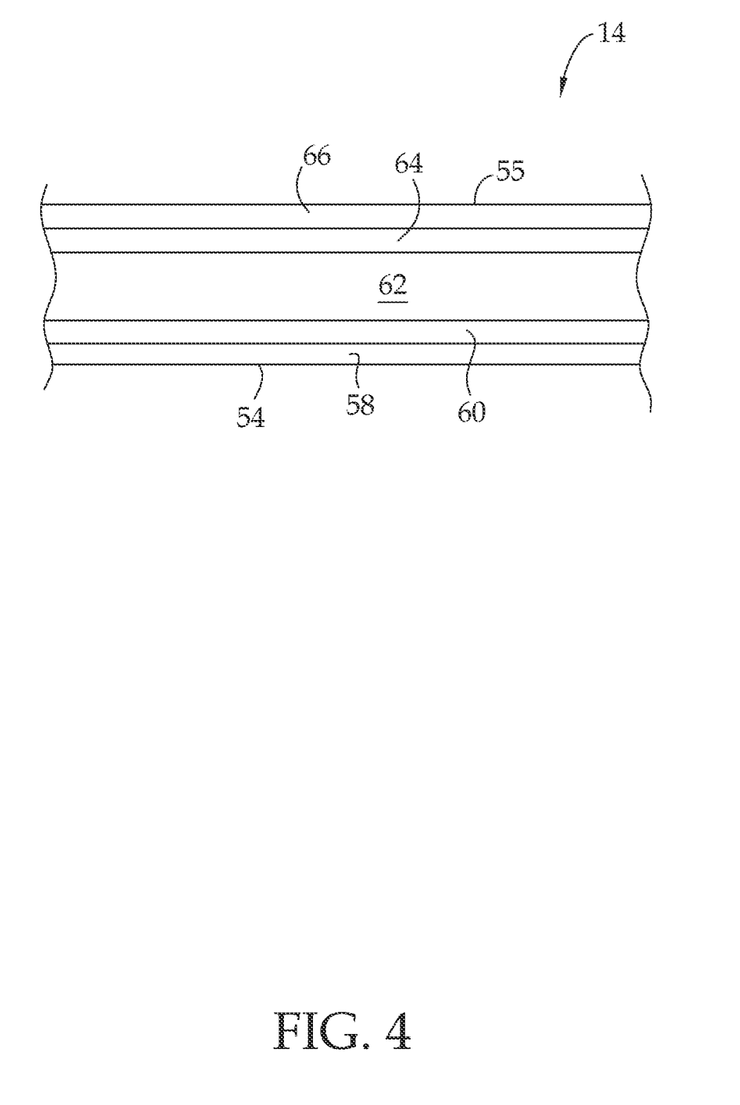
FIG. 4 is a schematic, fragmentary cross section view of the edge protection mat, illustrating the multi-layer construction.

With reference now being made to FIGS. 1, 3, and 4, the edge protection mat 14 preferably defines a generally rectangular configuration having opposed lateral edges 44, 46 and opposed longitudinal edges 48, 50. Each corner of the edge protection mat 14 may include a 1-2 inch (2.54-5.08 cm) long loop 52, preferably made of nylon, to anchor the edge protection mat in position. Unlike the rope protection mat 12, the edge protection mat 14 is intended to remain stationary during use in most applications.

The edge protection mat or sheet 14 is used to soften the bend radius of the rope as it goes over the edge of a building or used underneath metal climbing gear to prevent them from being damaged by the building or rocks, etc. With particular reference to FIG. 4, edge protection mat 14 has a multi-layer construction including an outward or bottom surface 54 and inward or upper surface 55. In preferred embodiments, the outermost layer 58 is preferably formed from the aforementioned nylon weave in a herringbone pattern, intermediate layer 60 is made of 1000D ballistic nylon, intermediate layer 62 is made from a high loft, three-dimensional textile such as the HiFlow™ Spacer Fabrics from Highland Industries, intermediate layer 64 is made from 1000D ballistic nylon and inner most layer 66 is made from the aforementioned nylon weave, also in a herringbone pattern. In alternate embodiments where even more robust protection is desired, the outermost layer 58 is made from 0.25 inch thick nylon webbing and intermediate layer 60 is made from 1680D ballistic nylon.

As visual safety indicators, as seen in FIG. 3, reflective trim 68 may be used around the perimeter edges (44, 46, 48, 50) of the edge protection mat 14 and the layers may be sewn together using a silver reflective thread 70. In addition, it is preferred that intermediate layers 60 and 64 be of contrasting color compared to outer layers 58 and 66 as further visual safety indicators. The reason is that as the external layers 58, 66 begin to wear, the high contrast color will begin to telegraph through and alert the user that the protection afforded by the mat has been compromised, for instance in circumstances where edge protection mat 14 experiences a high degree of friction or abrasion during a single use, or over many uses. Additionally, or in the alternative, edge protection mat 14 may qualify as fire/flame resistant under ANSI/ISEA 107-2015.

Figure 5:
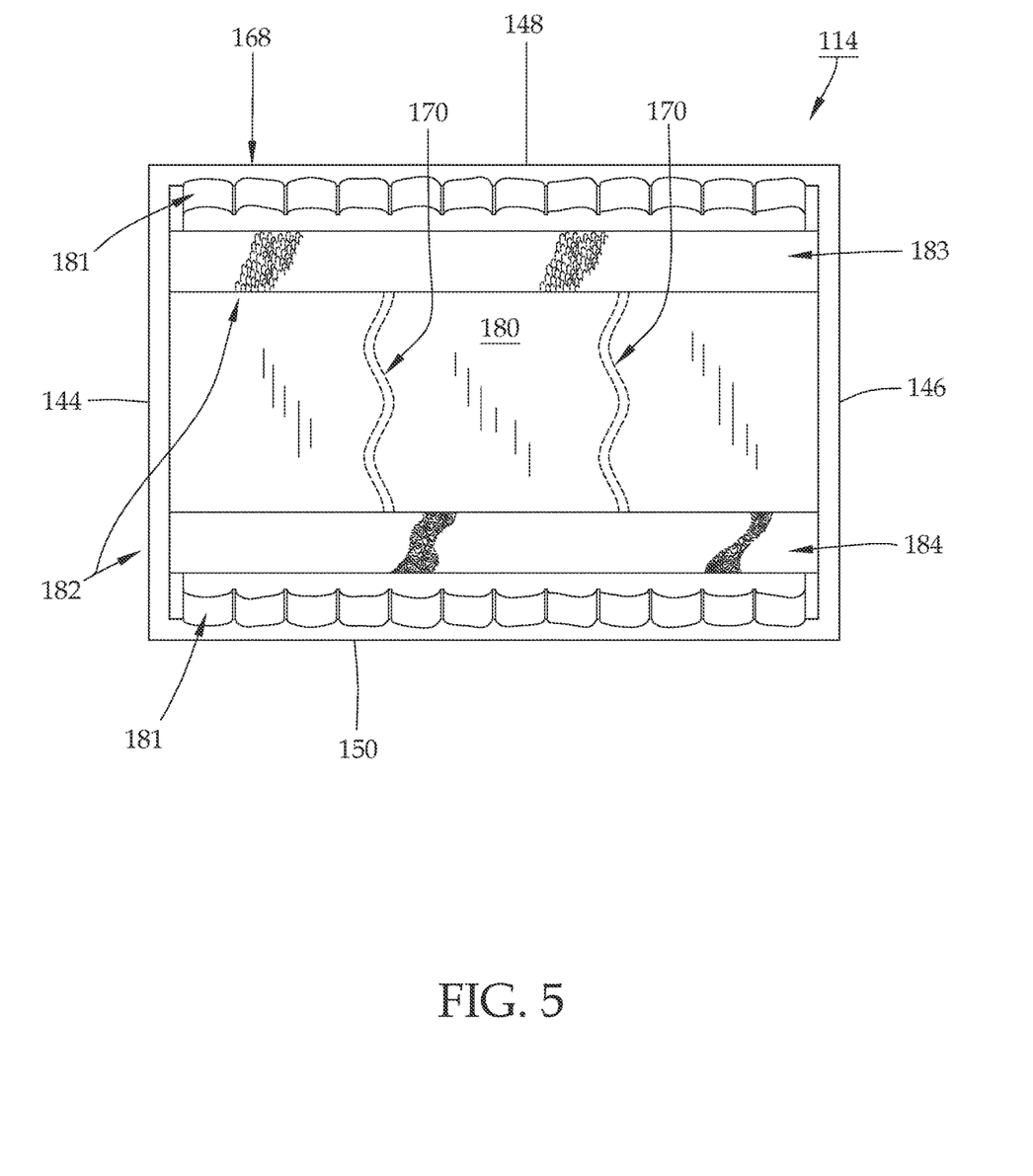
FIG. 5 is a plan view of a preferred embodiment of the rope edge protection system, illustrating a top view of an edge protection mat.
Figure 6:
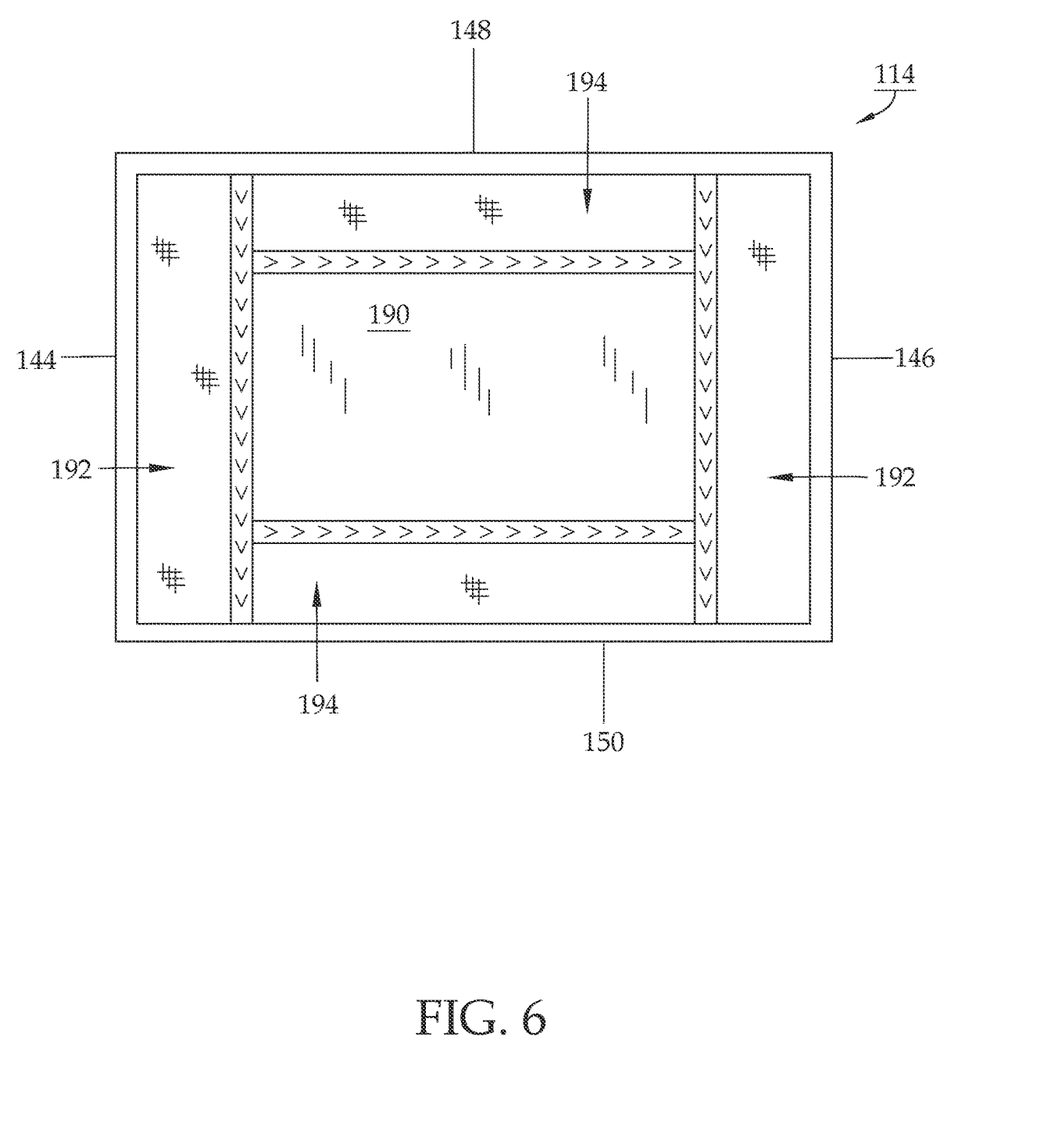
FIG. 6 is a bottom view of the edge protection mat of FIG. 5.
Figure 7:
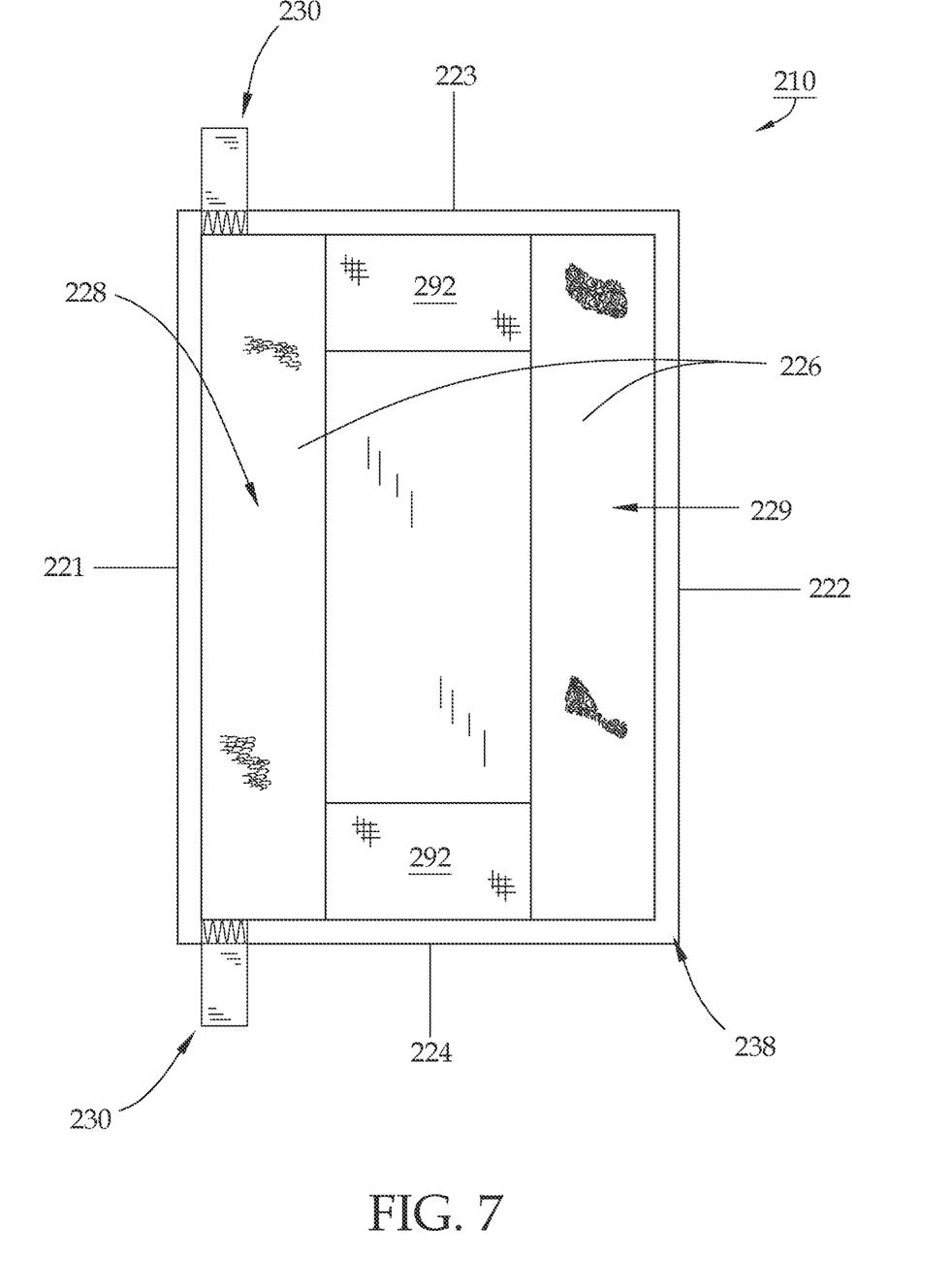
FIG. 7 is a top view of a rope protection sleeve.
Figure 8:
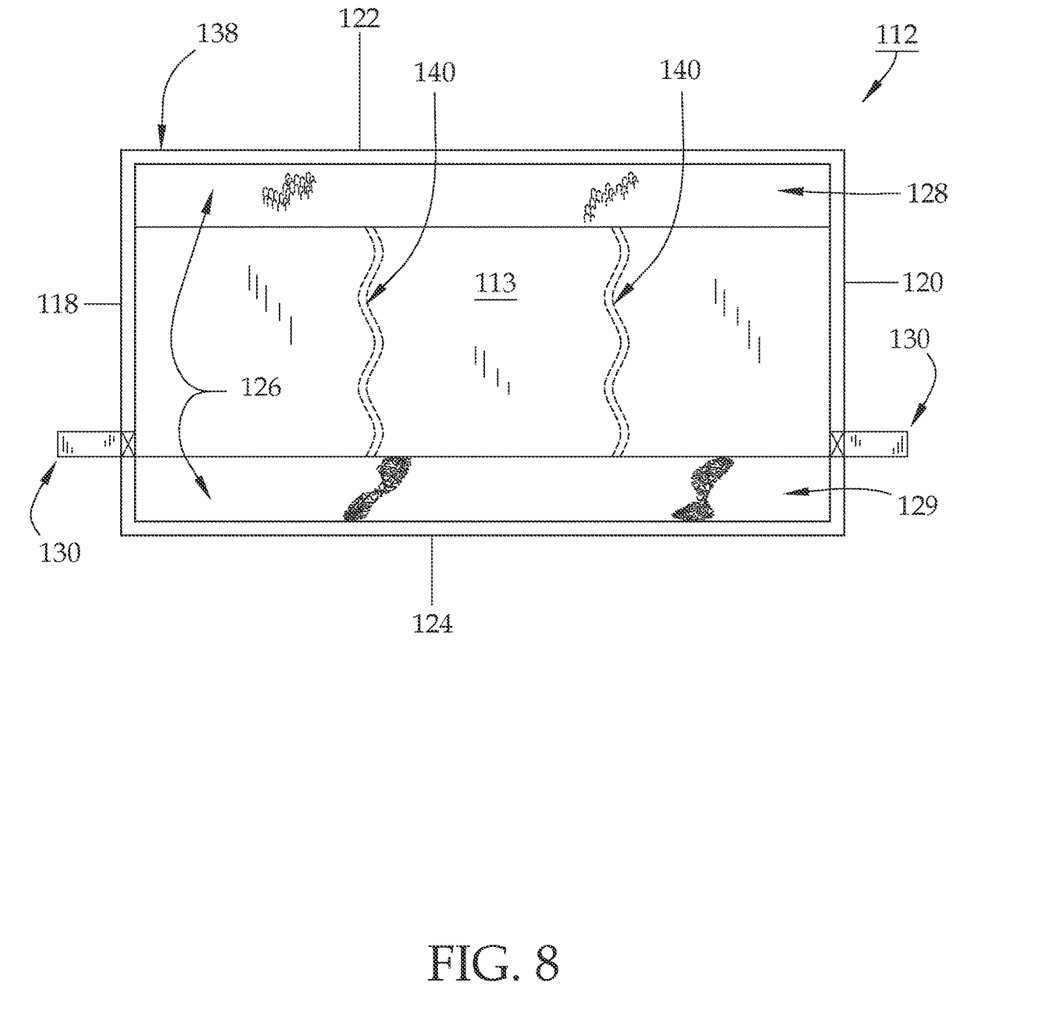
FIG. 8 is a plan view of a preferred embodiment of a rope edge protection system, illustrating a bottom view of a replaceable abrasion pad.
Figure 9:
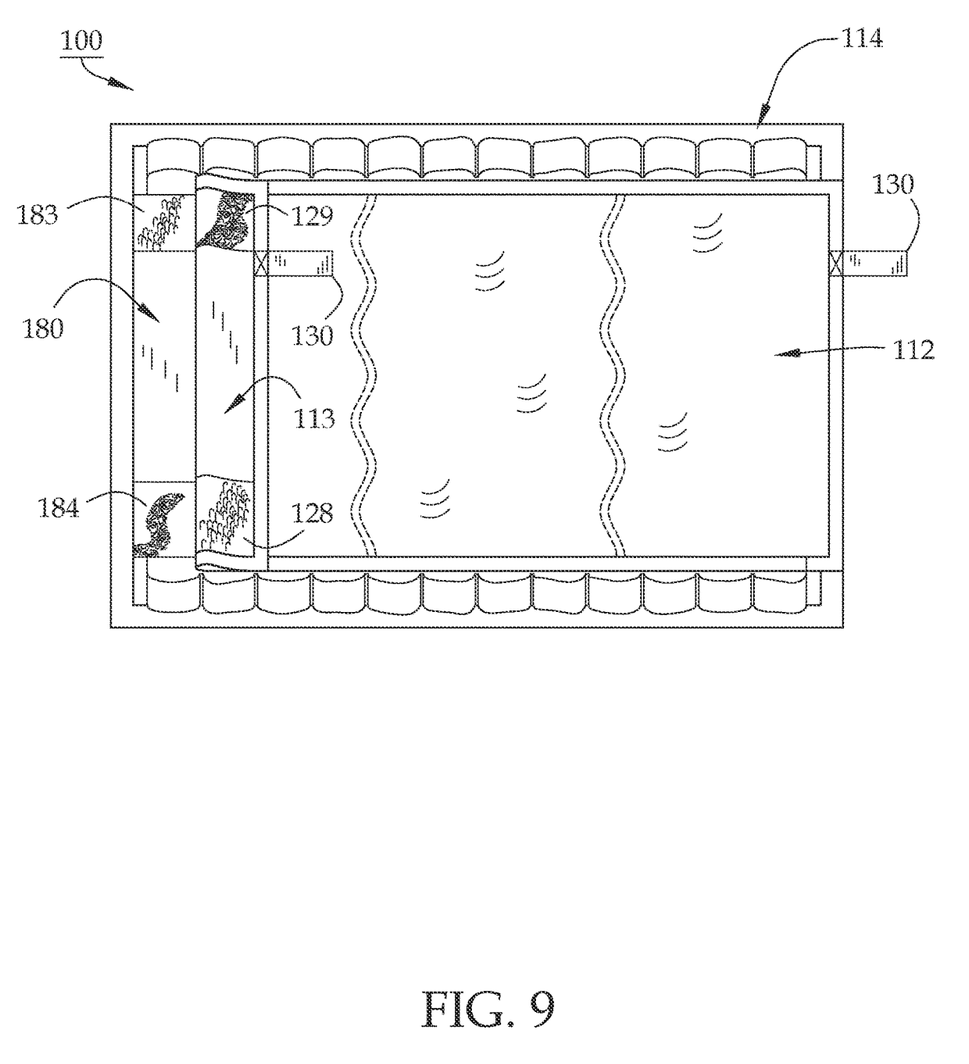
FIG. 9 is a plan view showing the bottom view of the replaceable abrasion pad of FIG. 8 removably attached to the top side of the edge protection mat of FIG. 5.

FIGS. 5-10 show another preferred embodiment of the rope edge protection system 100 comprising an edge protection mat 114 and a rope protection mat also referred to as replaceable abrasion pad 112. FIGS. 5 and 6 illustrate the edge protection mat 114 defining a top side 180 and a bottom side 190. The edge protection mat 114 preferably defines a generally rectangular configuration having opposed lateral edges 144, 146 and opposed longitudinal edges 148, 150. The top side 180 may include a fastener 182 having a first fastener component 183 and a second fastener component 184. The preferred fastener components 183, 184 are located near the longitudinal edges 148, 150. The rope edge protection system 100 preferably includes a replaceable abrasion pad 112 (as best seen in FIGS. 8-9) that is configured to be removably attached to the edge protection mat 114 at the first and second fastener components 183, 184. The replaceable abrasion pad 112 may be defined as a mat that will be subject to abrasion from a rope being pulled across and in tension over the replaceable abrasion pad 112.

The edge protection mat 114 may be stationary during use in most applications. In the preferred embodiment of the edge protection mat 114, the bottom side 190 (shown in FIG. 6) of the edge protection mat 114 includes two lateral frictional sections 192 and two longitudinal frictional sections 194. The lateral frictional sections 192 and longitudinal frictional sections 194 are formed from a material that defines a large dry kinetic coefficient of friction rating and a large wet kinetic coefficient rating, preferably a dry kinetic coefficient friction rating greater than 2.0 N and a wet kinetic coefficient friction rating greater than 2.0 N. The large dry and wet kinetic coefficient of friction ratings instill resistance to horizontal force vectors in the edge protection mat 114. The lateral frictional sections 192 and longitudinal frictional sections 194 are preferably formed from "Gripping Material", Product Number GM640, commercially available from 3M™ which is formed from a thermoplastic elastomer and a polymeric knit backing. This material defines thousands of micro-replicating gripping fingers (not shown in detail) that securely engage smooth and/or wet surfaces. This comparatively soft material defines a hardness rating of 40 Shore A, is 33 millimeters (0.8 inches) thick and weighs 12.4 ounces per yard squared (420 g/m$^2$). This high durability material defines a dry kinetic coefficient of friction rating of 3.5 N and a wet kinetic coefficient of friction rating of 3.4 N in view of ASTM D-1894.

As seen in FIGS. 5 and 9 the top side 180 of the edge protection mat 114 preferably includes one or more series of spaced-apart loops, referred to herein as a "daisy-chain," 181. One daisy-chain 181 is located between the longitudinal edge 148 and first fastener component 183 and the other daisy-chain 181 is located between the longitudinal edge 150 and second fastener component 184. The daisy-chains 181 are included to provide attachment points for various accessories when system 100 is in use. Daisy-chains 181 may also assist to prevent total failure of the rope edge protection system 100 in the event that one or more of the spaced-apart loops fail within the respective daisy chain 181.

Referring to FIG. 8, an embodiment of the replaceable abrasion pad 112 is shown, illustrating a generally rectangular configuration defined by opposing lateral edges 118, 120 and opposing longitudinal edges 122, 124. The replaceable abrasion pad 112 further comprises an abrasion pad fastener 126 having first fastener section 128 and a second fastener section 129. Said first and second fastener sections 128, 129 are positioned along respective different longitudinal edges 122, 124. First and second fastener sections 128, 129 may be mated with one another, enabling at least a portion of the length of the longitudinal edges 122 and 124 to be removably attached to each other. In the preferred embodiment, the first fastener section 128 and second fastener section 129 of the replaceable abrasion pad 112 are configured to be removably attachable to edge mat fastener components 183, 184. When first fastener section 128 and second fastener section 129 are fastened to respectively second fastener component 184 and first fastener component 183, the replaceable abrasion pad 112 is configured so that the inner surface 113 of the abrasion pad 112 is flush with the top side 180 of the edge protection mat 114. Fastener sections 128, 129 and fastener components 183, 184 are preferably formed from hook and loop material, however, other non-limiting examples of fasteners which may be used are buttons, snaps, zippers, hook and eye fasteners or magnetic fasteners. In the preferred embodiment, the replaceable abrasion pad 112 is formed from nylon, most preferably three layers of nylon. In one or more embodiments, the replaceable abrasion pad 112 should define a sufficient modulus of flexion to provide an opening large enough for a load-bearing rope to pass through the opening created when the fastener sections 128, 129 are engaged and the edges 122, 124 are attached to each other so that the replaceable abrasion pad 112 may also function as a sleeve like the rope protection mat 12 as seen in FIG. 1. In the preferred embodiment, the abrasion pad 112 includes one or more hanging loops 130 provided for attachment points that extend from either lateral edge 118, 120. In one or more embodiments, a trim 138 is included that follows the perimeter edges (118, 120, 122, 124) of the abrasion pad 112. The abrasion pad 112 includes one or more threads 140 that are configured to affix all of the layers of the abrasion pad 112 to one another.

FIG. 9 illustrates an instance where the replaceable abrasion pad 112 is removably attached to the edge protection mat 114. The engaged edge protection mat 114 and replaceable abrasion pad 112 are configured to be placed over an edge of a building, for example. In this configuration, although not shown as would be understood, the bottom side 190 of edge protection mat 114 would be flush with the edge of a building or other structure and a rope would be pulled in tension resting overtop the replaceable abrasion pad 112. After repeated usage in this configuration, the replaceable abrasion pad 112 will be worn down more quickly than the edge projection mat 114 and after sufficient wear and tear, the worn replaceable abrasion pad 112 may be replaced with another replaceable abrasion pad 112 for continued use with the edge protection mat 114. By replacing the replaceable abrasion pad 112 after sufficient wear and tear, the edge protection mat 114 will be subject to less wear and tear over time and thus have an extended useful life.

Figure 10:
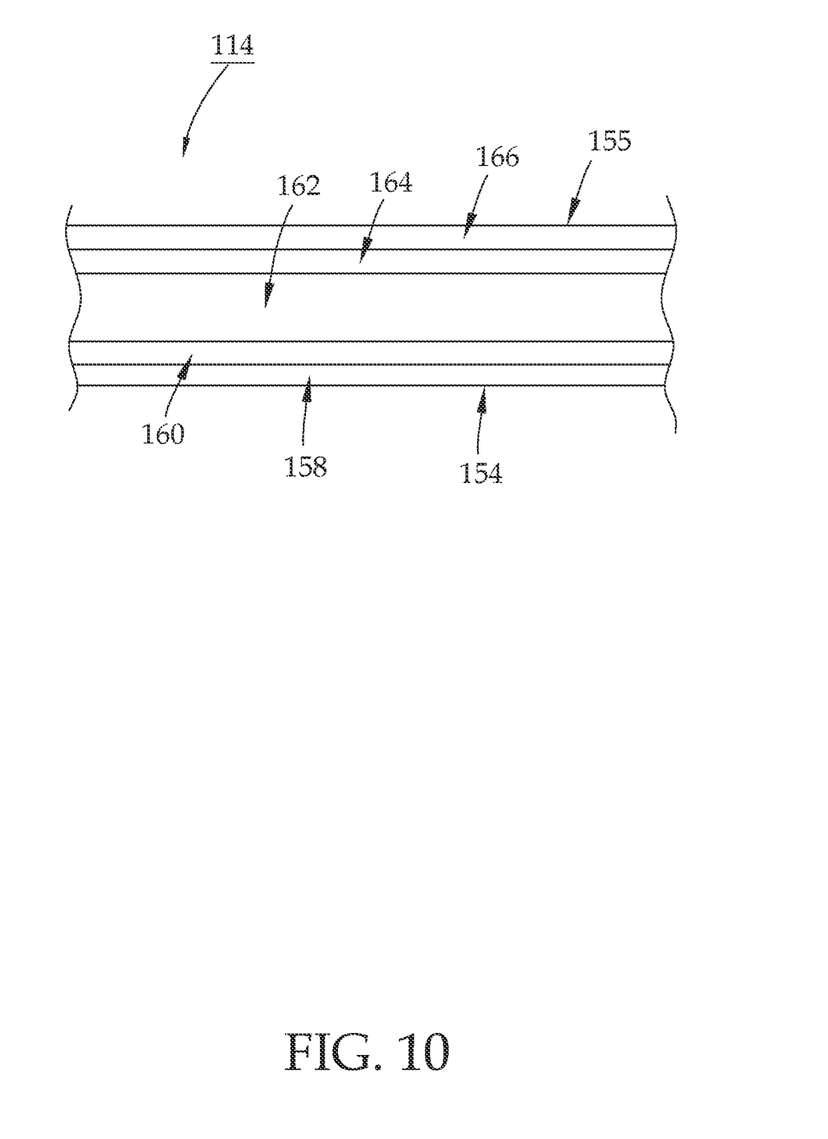
FIG. 10 is a schematic, fragmentary cross section view of the edge protection mat, illustrating the multi-layer construction.

The edge protection mat 114 is used to soften the bend radius of the rope as it goes over the edge of a building or used underneath metal climbing gear to prevent them from being damaged by the building or rocks, etc. With particular reference to FIG. 10, edge protection mat 114 has a multi-layer construction including an outward or bottom surface 154 and inward or upper surface 155. In preferred embodiments, the outermost layer 158 of bottom side 190 is preferably formed from the aforementioned nylon weave in a herringbone pattern, outer intermediate layer 160 is made of 1000D ballistic nylon, central intermediate layer 162 is made from a high loft, three-dimensional textile such as the HiFlow™ Spacer Fabrics from Highland Industries, inner intermediate layer 164 is made from 1000D ballistic nylon and innermost layer 166 of top side 180 is made from the aforementioned nylon weave, also in a herringbone pattern. In alternate embodiments where even more robust protection is desired, the outermost layer 158 is made from 0.25 inch thick nylon webbing and intermediate layer 160 is made from 1680D ballistic nylon.

As seen in FIGS. 5 and 6, a trim 168 may be used around the perimeter edges (144, 146, 148, 150) of the edge protection mat 114 and the layers may be sewn together using a thread 170. In one or more embodiments, as visual safety indicators, the trim 168 is formed from a reflective material and the thread 170 is formed from a silver reflective thread. In a preferred embodiment, to prevent reflection, the trim 168 is formed from a matte material and the thread 170 is formed from a matte material. Matte is defined as meaning dull and flat, without shine. In another preferred embodiment, the trim 168 and thread 170 are formed from materials that are visible under infrared light. Embodiments where the trim 168 and/or thread 170 are formed from materials visible under infrared light is particularly advantageous when being used in rescue operations being performed under the cover of night or similarly low-light circumstances. In addition, it is preferred that intermediate layers 160 and 164 be of contrasting color compared to outer layers 158 and 166 as further visual safety indicators. The reason is that as the external layers 158, 166 begin to wear, the high contrast color will begin to telegraph through and alert the user that the protection afforded by the edge protection mat 114 has been compromised, for instance in circumstances where edge protection mat 114 experiences a high degree of friction or abrasion during a single use, or over many uses. Additionally, or in the alternative, edge protection mat 114 may qualify as fire/flame resistant under ANSI/ISEA 107-2015.

Now referring to FIG. 7, in one or more embodiments, the rope edge protection system 100 includes a rope protection sleeve 210. The rope protection sleeve 210 defines a generally rectangular configuration having two opposing longitudinal edges 221, 222 and two opposing lateral edges 223, 224. The rope sleeve 210 comprises one or more, and preferably two frictional sections 292 formed from an abrasive material that defines a large dry kinetic coefficient of friction rating and a large wet kinetic coefficient rating, preferably a dry kinetic coefficient friction rating greater than 2.0 N and a wet kinetic coefficient friction rating greater than 2.0 N. The frictional sections 292 are preferably positioned at different lateral edges 223, 224. The frictional sections 292 are preferably formed from the same "Gripping Material", Product Number GM640, commercially available from 3M™ as described above. The rope protection sleeve 210 further comprises a fastener 226. Fastener 226 includes a first fastener element 228 and a second fastener element 229. The first and second fastener elements 228, 229 are positioned along respectively different longitudinal edges 221, 222 enabling at least a portion of the length of the longitudinal edges 221 and 222 to be removably attached to each other when sleeve 210 is folded over such that the first and second fastener components 228, 229 are mated with one another. Fastener elements 228, 229 are preferably formed from hook and loop material however other non-limiting examples of fasteners are buttons, snaps, zippers, hook and eye fasteners, or magnetic fasteners. In the preferred embodiment, the rope protection sleeve 210 includes two hanging loops 230, one hanging loop 230 extending from lateral edge 223 and one hanging loop extending from lateral edge 224 for attachment means. A trim 238 may be used around the perimeter edges (221, 222, 223, 234) of the sleeve 210. Rope protection sleeve 210 should define a sufficient modulus of flexion to provide an opening large enough such that a user (not shown) would be able to fold the sleeve over a load-bearing rope such that longitudinal edges 221, 222 can be pressed together melding fastener elements 228, 229 together. The respective frictions sections 292 will grasp and prevent the rope (not shown) from slipping within rope protection sleeve 210 to provide rope protection on a variety of surfaces that may be encountered during use such as when anchoring materials or on fixed ropes.

The illustrations and examples provided herein are for explanatory purposes and are not intended to limit the scope of the appended claims, and while specific terms have been employed, they are used in a generic and descriptive sense only. Modifications and alternatives that may suggest themselves to those skilled in the art upon reading the foregoing disclosure are intended to be considered within the scope of the disclosure.

We claim:

1. An edge protection mat comprising:
a mat defined as a flat, generally rectangular sheet having a pair of opposed longitudinal edges and a pair of opposed lateral edges,
the mat comprising a material construction with an inside surface layer, an outside surface layer, and one or more intermediate layers,
wherein the inside surface layer is made of a first material and the one or more intermediate layers is made of a second material, and
wherein the mat comprises at least one visual safety indicator; and
wherein the first material is made of a hi-vis color material and/or a high contrast color material.

2. The edge protection mat of claim 1, wherein the second material is made of a hi-vis color material and/or a high contrast color material.

3. The edge protection mat of claim 1, wherein the visual safety indicator comprises reflective stitching securing the first material and the second material.

4. The edge protection mat of claim 1, wherein one or more of the pair of opposed longitudinal edges and/or one or more of the pair of opposed lateral edges of the mat comprise the visual safety indicator.

5. The edge protection mat of claim 1, wherein a loop is secured to at least one corner of the mat.

6. The edge protection mat of claim 5, wherein the loop defines a length of one to two inches.

7. The edge protection mat of claim 1, wherein the edge protection mat qualifies as fire/flame resistant under ANSI/ISEA 107-2015.

8. A rope edge protection system comprising, in combination:
a rope protection mat and an edge protection mat,
the edge protection mat defined as a flat, generally rectangular sheet having a pair of opposed longitudinal edges and a pair of opposed lateral edges,
the edge protection mat comprising a multiple-layer material with an inside surface layer,
an outside surface layer, and one or more intermediate layers,
wherein the inside surface layer is made of a first material and the one or more intermediate layers is made of a second material, and wherein a first loop is secured to at least one corner of the edge protection mat.

9. The rope edge protection system of claim 8, wherein the first loop defines a one to two inch long loop made of nylon.

10. The rope edge protection system of claim 8, wherein one or both of the rope protection mat and the edge protection mat comprise at least one visual safety indicator.

11. The rope edge protection system of claim 10, wherein one or more of the pair of opposed longitudinal edges and/or one or more of the pair of opposed lateral edges of the edge protection mat comprise the visual safety indicator.

12. The rope edge protection system of claim 10, wherein the visual safety indicator comprises reflective stitching securing the first material and the second material.

13. The rope edge protection system of claim 8, wherein the edge protection mat qualifies as fire/flame resistant under ANSI/ISEA 107-2015.

14. The rope edge protection system of claim 8, wherein the rope protection mat comprises a flat, generally rectangular sheet having an inside surface, an outside surface, a pair of opposed longitudinal edges and a pair of opposed lateral edges; the rope protection mat including fasteners to maintain the mat in a rolled, sleeve-like configuration around a climbing rope.

15. The rope edge protection system of claim 14, wherein the rope protection mat further comprises a second loop secured to at least one corner of the rope protection mat.

16. The rope edge protection system of claim 15, wherein the second loop defines a one to two inch long loop made of nylon.

17. The rope edge protection system of claim 8, wherein the first material and second material are different.

18. The rope edge protection system of claim 8, wherein the first material is made of a hi-vis color material and/or a high contrast color material.

19. The rope edge protection system of claim 8, the second material is made of a hi-vis color material and/or a high contrast color material.

\* \* \* \* \*